Dec. 21, 1926.
B. L. SANBORN
GATE SPRING AND MOUNTING
Filed June 30, 1926
1,611,238
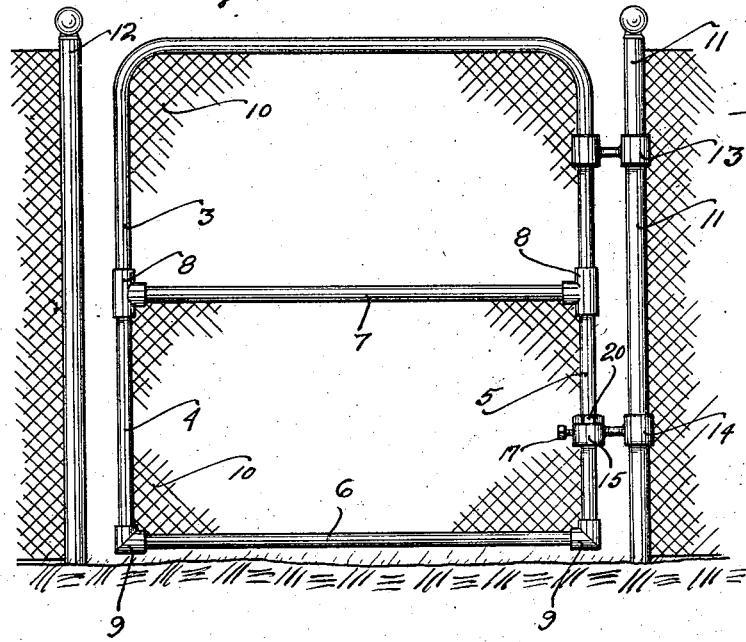
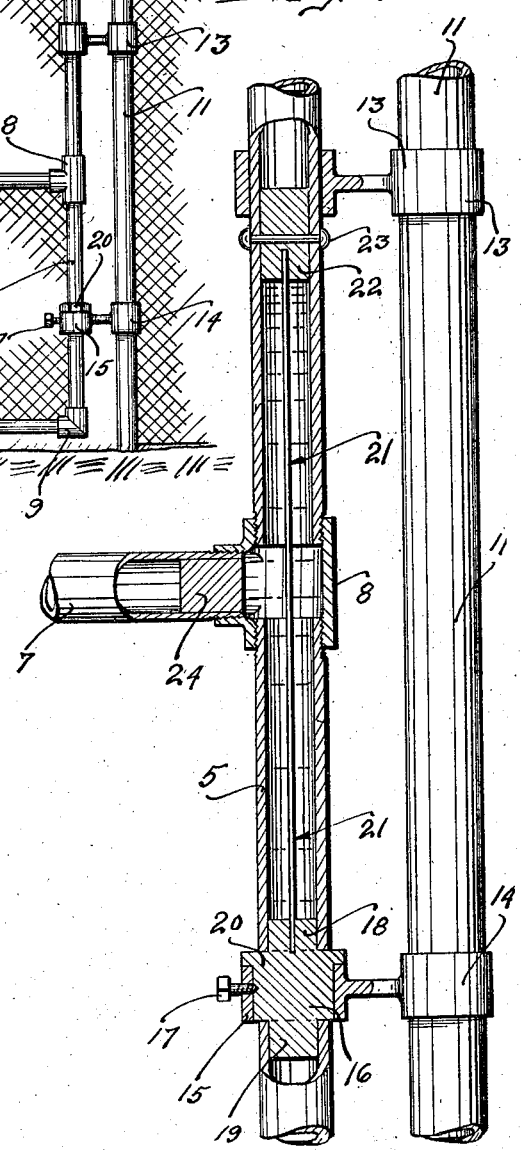
Inventor
Burt L. Sanborn
By his Attorneys
Merchant Kilgore Patented Dec. 21, 1926.

1,611,238

UNITED STATES PATENT OFFICE.

BURT L. SANBORN, OF MINNEAPOLIS, MINNESOTA.

GATE SPRING AND MOUNTING.

Application filed June 30, 1926. Serial No. 119,602.

My invention provides an improved gate spring and mounting and, generally stated, consists of the novel devices, combinations of devices and arrangement of parts hereinafter described and defined in the claims.

The preferred form of the invention is illustrated in the accompanying drawings, wherein like characters indicate like parts throughout the several views.

Referring to the drawings:

Fig. 1 is an elevation showing a gate embodying and installed in accordance with my invention; and Fig. 2 is a fragmentary view with some parts in vertical section, illustrating in detail the manner of applying the spring and mounting the gate.

The gate itself may take different forms, but, as shown, it comprises an approximately rectangular marginal frame 3 made up of pipe sections 3, 4, 5, 6 and 7. In this particular structure illustrated, the pipe sections 4 and 5 are connected to the downturned side members of the U-shaped pipe section 3 by T-couplings 8 that also serve to connect the sides of the gate frame to the ends of the cross pipe member 7, and the ends of the lower pipe sections 6 are connected to the lower ends of the pipe sections 4 and 5 by elbow couplings 9. The body of the frame is shown as filled in by a woven wire 10. This gate, as shown, is mounted between upright fence posts 11 and 12, said posts, as illustrated, being pipe sections properly supported by having their ends set into the ground or otherwise rigidly held. The gate is supported for lateral swinging movements from the post 11 by means of an upper gate-supporting bracket 13 and a lower gate-supporting bracket 14. The projecting end of the upper bracket 13 is tubular and the downturned adjacent portion of the frame member 10 is passed therethrough and pivotally mounted therein. The lower bracket 14, at its extended end, is in the form of a sleeve 15 into which is set a pivot hub 16 that is capable of rotary adjustments in said sleeve but is rigidly held therein by a set screw 17. This pivot hub 16 has an upwardly extended reduced trunnion 18 and a similar and axially aligned depending trunnion 19. The tubular frame member 5 is sectioned or, in other words, has a piece cut out so that its severed ends are telescoped onto the trunnions 18 and 19.

The gate thus mounted is free to swing in the sleeve-like upper portion 13 and on the trunnions 18 and 19. To facilitate rotary adjustments of the hub 16, it is shown as formed with an exposed angular or nut-like flange 20, to which a wrench may be applied.

The gate spring is in the form of a flat spring-tempered leaf or bar 21, the lower end of which is set into a slit formed in the trunnion 18, and the upper end of which is set into a slit formed in a plug 22 rigidly secured in the hinged arm of the frame member 3 by a rivet or bolt 23. By this arrangement, the lower end of the spring is anchored against rotary movement, while the upper end of the spring is connected for rotary or oscillatory movements with the gate. Obviously, the said spring 21 will tend to assume a flat and straight condition. The spring 21, as is evident, is a torsion spring, that is, it acts under torque strain to close the gate. If the gate be a double-swinging gate, that is, one arranged to swing in either direction from a closed position, then the hub 16, which affords a spring anchor, will be so adjusted that the gate will be in its closed position when the spring 21 is free and in normal condition, and with such adjustment, it is evident that when the gate is swung in either direction and then released, the spring will restore the gate to its closed position; but if the gate be one arranged to swing to a closed position against a stop, then the hub 16 may be adjusted so as to normally hold the gate closed under any desired tension. Obviously, by loosening the set screw 17 and applying a wrench to the flange 20, the hub 16 may be quickly adjusted to any desired position and then secured by tightening the set screw.

A spring applied as described will, of course, be protected from the weather, will be out of sight, and guarded from obstructions or from passing objects. Moreover, when enclosed, as shown, it may be encased in hard oil or other suitable lubricating substance. To afford a closed chamber for the spring, a plug 24 is shown as placed in the pipe section 7, as shown in Fig. 2. By reference to Fig. 2, it will be noted that the hub 16, in addition to the functions noted, serves to hold the gate against downward movements, inasmuch as the upper pipe section rests directly on the flange 20.

The invention described, while efficient generally for the purposes had in view, is of simple construction and of low cost.

What I claim is:

1. The combination with a gate post having laterally projecting upper and lower gate-supporting brackets terminating in axially aligned sleeves, of a gate having a tubular member pivotally extended through the sleeve of the upper bracket, a hub rigidly but adjustably secured in the sleeve of the lower bearing bracket and having upwardly and downwardly projecting trunnions, said tubular gate member having a gap affording separated sections, the ends of which are journaled on said trunnions, and a torsion spring applied in the tubular member of said gate, anchored at its lower end to said upwardly projected trunnion and at its upper end anchored to said tubular gate member.

2. The combination with a gate post having laterally projecting upper and lower gate-supporting brackets terminating in axially aligned sleeves, of a gate having a tubular side member pivotally mounted in the sleeve of the upper bracket, a hub rotatively adjustable in the sleeve of said lower bracket and having upwardly and downwardly projecting trunnions, a set screw applied to the sleeve of said lower bracket for adjustably anchoring said hub, said hub having an angular flange for the application of a wrench or the like thereto, a plug secured in the tubular side member of said gate above said hub, and a flat torsion spring set into said upper trunnion and into the plug of said frame.

In testimony whereof I affix my signature.

BURT L. SANBORN.